United States Patent [19]

Thomas et al.

[11] 4,165,716

[45] Aug. 28, 1979

[54] PROCESS AIR COOLERS USED FOR COMBUSTION AIR PREHEATING

[75] Inventors: John W. Thomas, Shaker Heights; Ronald L. Harris, Clinton, both of Ohio

[73] Assignee: The Standard Oil Company, Cleveland, Ohio

[21] Appl. No.: 807,709

[22] Filed: Jun. 17, 1977

[51] Int. Cl.² .............................................. F22B 33/18
[52] U.S. Cl. ..................................... 122/1 A; 122/356
[58] Field of Search ................. 122/DIG. 2, 1 A, 356

[56] References Cited

U.S. PATENT DOCUMENTS

| 2,623,507 | 12/1952 | Brinig | 122/DIG. 2 |
| 2,707,458 | 5/1955 | Hayden | 122/DIG. 2 |
| 3,426,733 | 2/1969 | Von Wiesenthal | 122/356 |
| 3,915,654 | 10/1975 | Oni et al. | 122/DIG. 2 |
| 3,938,934 | 2/1976 | Frondorf | 122/DIG. 2 |

FOREIGN PATENT DOCUMENTS

| 222266 | 7/1962 | Austria | 122/DIG. 2 |
| 465918 | 6/1950 | Canada | 122/DIG. 2 |

Primary Examiner—Kenneth W. Sprague
Attorney, Agent, or Firm—David J. Untener; Herbert D. Knudsen; Larry W. Evans

[57] ABSTRACT

An air-cooled process heat exchanger is connected to a process fired heater which uses ambient air for combustion. The exhaust air from the heat exchanger is used as preheated air to the combustion furnace, resulting in energy savings and decreased fuel consumption.

28 Claims, 12 Drawing Figures

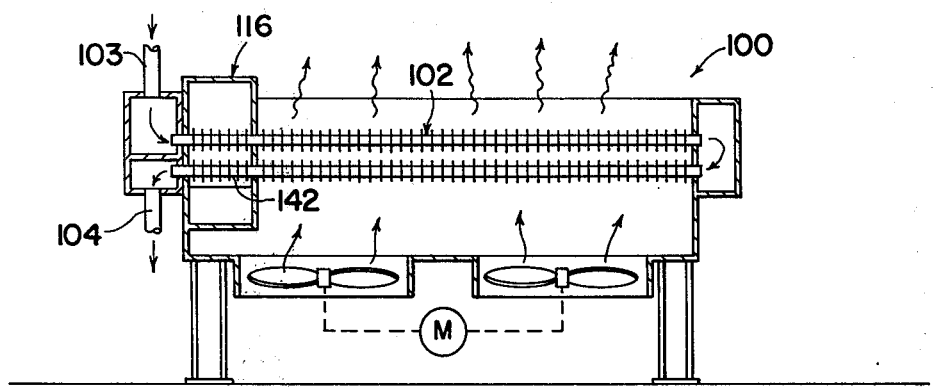
FIG. 5
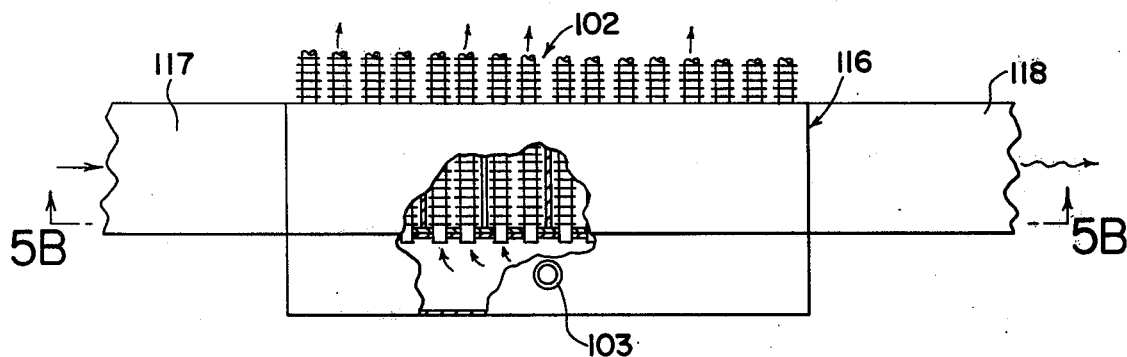
FIG. 5A
FIG. 5B
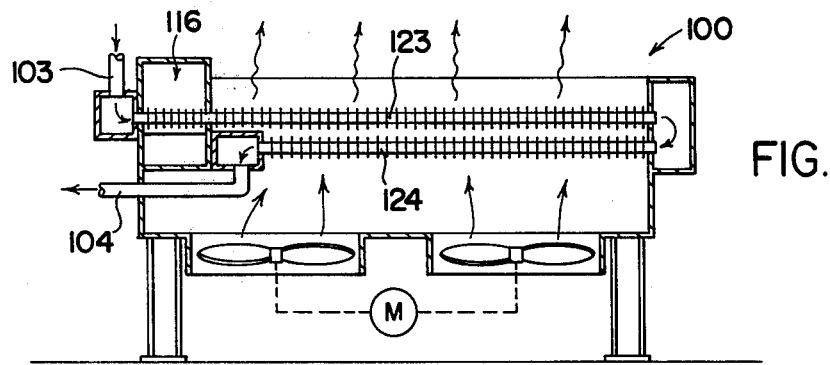
FIG. 6

PROCESS AIR COOLERS USED FOR COMBUSTION AIR PREHEATING

BACKGROUND OF THE INVENTION

Air-cooled heat exchangers, or air coolers, have been in use in the United States and elsewhere for many years. They are normally used where water for cooling is scarce, concern for water pollution is high, or the amount of heat to be removed is too low for water cooling to be economical. A discussion of air-cooled heat exchangers may be found in *Perry's Chemical Engineers Handbook*, 5th Ed., 1973, pages 11-23.

An air cooler normally consists of an array of finned tubes which contain the process stream to be cooled. A fan or blower is mounted above or below the tubes to force air across the tube bundle. The heated exhaust air is then dissipated to the atmosphere. Conventional air coolers are designed to handle large quantities of air with a small rise in air temperature. A variation of this is shown in U.S. Pat. No. 3,443,633 wherein the exhaust air is recirculated to prevent freezing during sub-zero operation.

Many attempts have been made to heat ambient combustion air prior to its use in a fired process heater or furnace. If the air is not preheated, then fuel must be used to heat the combustion air to the operating temperature of the furnace. Thus the higher temperature of the inlet combustion air the less fuel needed for the furnace.

Typically a steam coil or other heat source located at the furnace is placed in contact with the incoming air. Other methods include: a Ljungstrom Air Preheater, which exchanges heat from the flue gas exiting the furnace with the incoming air using a rotary device; U.S. Pat. No. 3,426,733 which discloses the use of a process stream to donate heat to the combustion air and then recover heat from the flue gases exiting the furnace; and U.S. Pat. No. 3,469,946 which discloses the use of a closed system containing a heat transfer liquid to exchange heat between the flue gas and the combustion air.

All of these methods suffer drawbacks ranging from reliability and corrosion problems to being non-economical. The present invention, however, employs hot air from process air coolers as the source of heated combustion air, requiring little in the way of extra mechanical equipment. There are no corrosion problems as associated with the use of flue gas. In addition, heated air that has in the past gone to waste, is now recovered and used to lower the fuel requirements of the furnace.

SUMMARY OF THE INVENTION

In a chemical processing operation in which a mixture of fuel and air is combusted in a furnace to provide heat input, and in which a process fluid, independent of said furnace is cooled by passing said process fluid in heat exchange relation with air in a process heat exchanger, and air passing out of said process heat exchanger is discharged to waste, the improvement wherein at least part of the air passing out of said heat exchanger is mixed with the air fed to said furnace so that the heat value of the air passing out of said heat exchanger is transferred to said furnace. The invention may also be stated as an apparatus for preheating air to a furnace comprising:

(a) a heat exchanger for effecting indirect heat exchange between a first process fluid and air;

(b) furnace means for combusting a fuel with air, being independent from said heat exchanger; and (c) means for transferring at least a part of the air passing out of said heat exchanger to said furnace means.

The invention is best understood by reference to the drawings.

BRIEF DESCRIPTION OF THE DRAWINGS

FIG. 5 is a side view of an exchanger having a serpentine airflow channel which increases the air temperature to the furnace.

FIG. 5A is a top view of FIG. 5 showing an embodiment of the serpentine flow design.

FIG. 5B is a sectional view of FIG. 5A showing the chambers within the airflow channel.

FIG. 6 is a view of another embodiment of the invention wherein some tubes of the exchanger bypass the air flow channel.

DETAILED DESCRIPTION OF THE DRAWINGS

Figure 1:
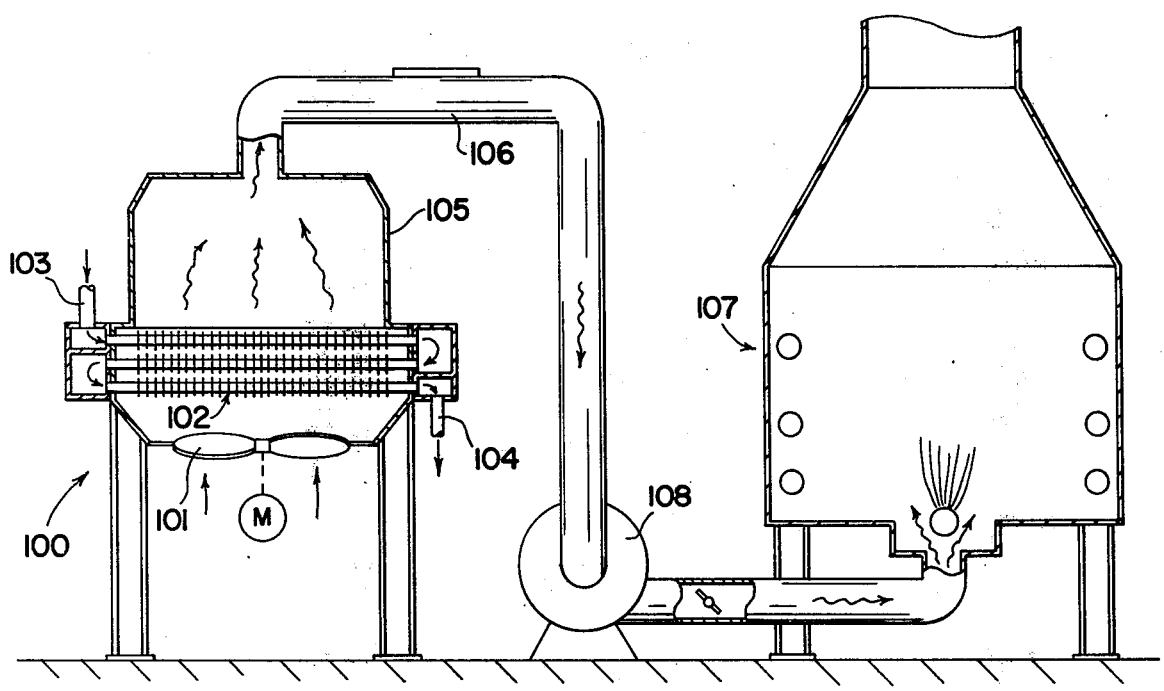
FIG. 1 is an elevation view showing the combination of an air-cooled process heat exchanger and a fired heater.

Referring to FIG. 1, an air-cooled heat exchanger 100 has fan 101 for moving air across a finned tube bundle 102. Conduits 103 and 104 are provided for receiving and discharging hot process fluid flowing through the bundle. One embodiment of collecting the heated air is by using hood 105 that covers the outlet of heat exchanger 100. Hood 105 is connected to duct 106 that provides means for transferring preheated air to heater 107. Where the distance between exchanger 100 and heater 107 is of any great length, blower 108 may be used to provide sufficient air pressure to the fired heater.

Figure 2:
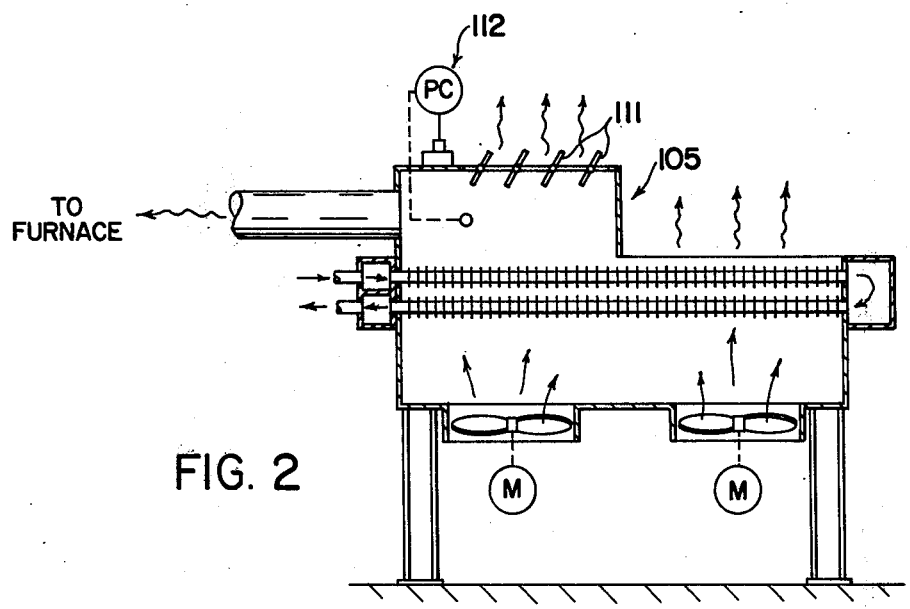
FIG. 2 is a view of another embodiment of the invention wherein means are provided for controlling the flow of air to the heater.

FIG. 2 shows a second embodiment of the invention for controlling the amount of air going to heater 107. Located on hood 105 and used to collect the heated air are dampers 111. These dampers are controlled by means such as pressure control 112 as shown. If less air is needed at the heater, then the pressure in hood 105 increases, causing the dampers to open and release the unneeded air to the atmosphere.

Figure 3:
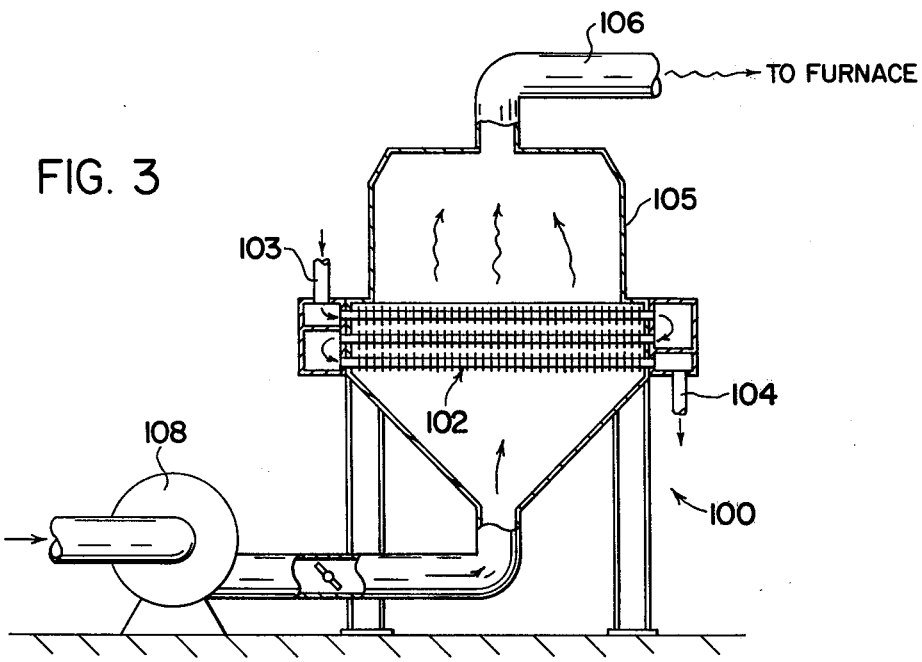
FIG. 3 shows a variation of FIG. 1 with the blower for moving air being located on the inlet of the heat exchanger.

FIG. 3, being similar to FIG. 1 shows blower 108 being located on the air inlet to exchanger 100. When using this embodiment, fan 101 is not required, blower 108 having sufficient pressure to force air across tube bundle 102 and through duct 106.

FIGS. 4 through 8 deal with various embodiments for collecting the air from the heat exchanger and methods for increasing the temperature of the air without adversely affecting the process being cooled.

Figure 4:
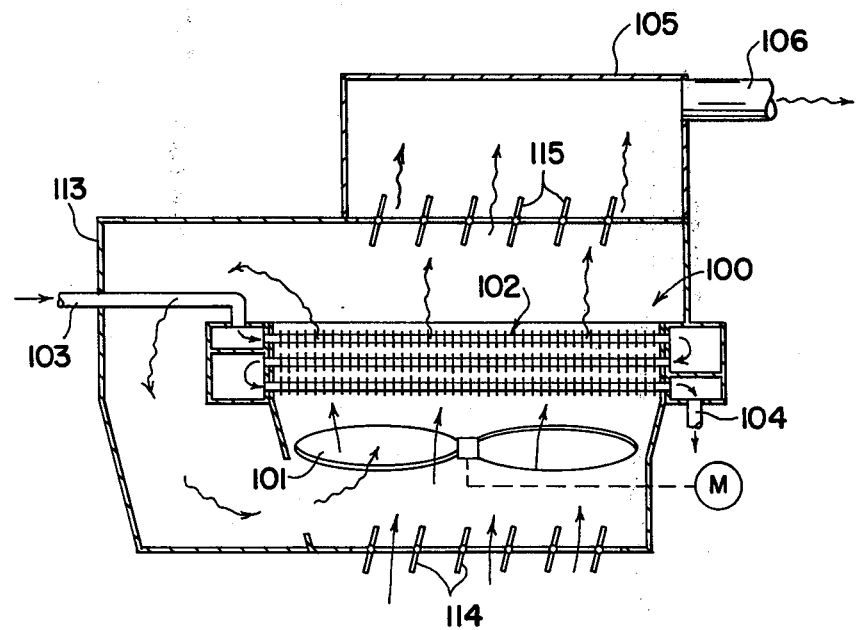
FIG. 4 shows a side view of the heat exchanger of the invention using an air recirculation system.

FIG. 4 shows how a typical air recirculation system may be incorporated into the present invention. The air-cooled exchanger 100 is enclosed in shell 113. This shell has inlet dampers 114, outlet dampers 115, and hood 105. If the temperature of the air moving across the tube bundle becomes too low, dampers 115 automatically start to close, forcing air to recirculate back to mix with the ambient air coming in through damper 114. This mixing prevents freezing of moisture upon the bundle, and also has the beneficial effect for the present invention of increasing the exhaust air exiting through dampers 115. Thus this system may be used with the present invention even if freezing is of little concern.

Another embodiment of increasing the exhaust air temperature from the air-cooled exchanger is shown in FIGS. 5, 5A and 5B. FIG. 5 shows an air exchanger 100 having a tube bundle 102. The process fluid enters port 103, flows across the exchanger and back, exiting through port 104. An airflow channel 116 is mounted perpendicular to the tubes in the bundle. This chamber, as shown in FIG. 5A, extends across the bundle 102. The chamber has air inlet 117 and air outlet 118. The flow of air is better shown in FIG. 5B. The airflow chamber consists of top chambers 119 and bottom chambers 120, the top chambers being offset with respect to the bottom chambers. The air flows in port 117, across the tubes into chamber 119, then downward across the tubes into chamber 120. The movement of the air thus creates a serpentine airflow across the tube bundle, finally exiting through port 118. This flow pattern elevates the exit temperature of the air without adversely affecting the air exchanger operation. The air into port 117 of airflow channel 116 may be from fan 101 as shown in FIG. 1. It is preferred, however, that the air that passes over the uncovered tube bundle 102 be used. Thus air already once heated is further increased in temperature by passing through the air channel. In one embodiment, this can easily be accomplished by placing inlet 117 of the airflow channel above the uncovered tubes. The air temperature may also be increased in the channel itself by removing the fins that are shown on return tubes 142 in FIG. 5.

FIG. 6 shows the airflow chamber applied to a two-pass heat exchanger. The process fluid enters through port 103, flows across the exchanger 100 in tube 123, turns and flows back through tube 124, exiting through port 104. The airflow channel 116 is located on one section of the exchanger. Tube 124 exits the exchanger prior to the airflow channel. This prevents the cooler process fluid from decreasing the temperature of the air flowing through air chamber 116.

Figure 7:
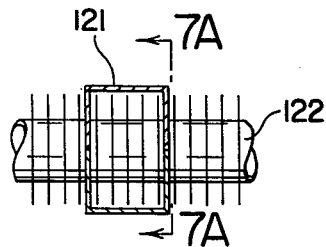
FIG. 7 is a side view of a means for blocking longitudinal flow between the serpentine channel and other parts of the air cooler bundle.
Figure 7A:
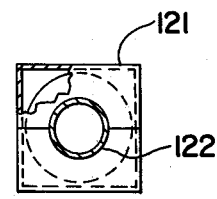
FIG. 7A is a front view of FIG. 7 showing the blocking means in greater detail.
Figure 8:
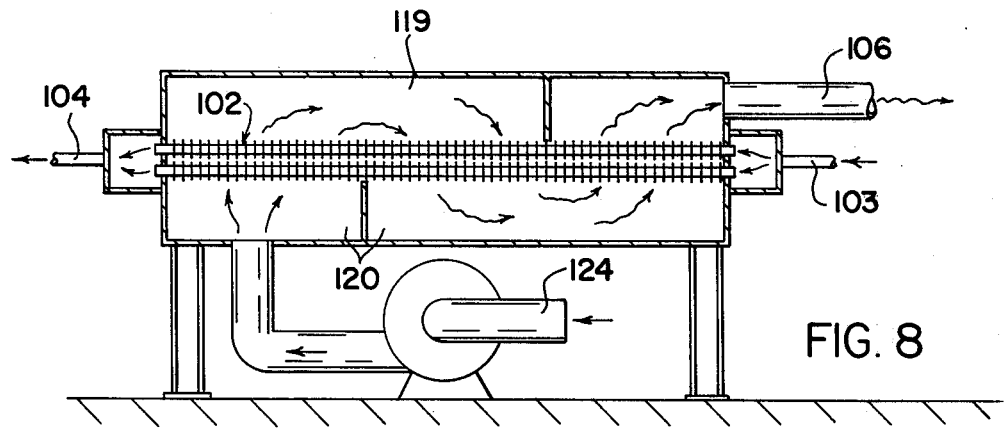
FIG. 8 is a side view of an embodiment of the invention as applied to a single pass heat exchanger.

To prevent loss of air out of the airflow channel, a device such as shown in FIG. 7 and 7A may be used. Block 121 fits over a tube 122 at the outside edge of the flow channel. The sides of the block 121 abut the sides of other such blocks located on the other tubes in the bundle, thus preventing air from flowing out of the channel.

Where the air exchanger is single pass, the airflow chamber may run parallel to the tube bundle instead of perpendicular. FIG. 8 shows such an arrangement wherein the airflow channel covers the entire exchanger. The channel again has top chambers 119 and offset bottom chambers 120. Air flows through port 124 across and countercurrent to the process flow in the bundle 102, and exits into duct 106 which proceeds to the heater.

Figure 9:
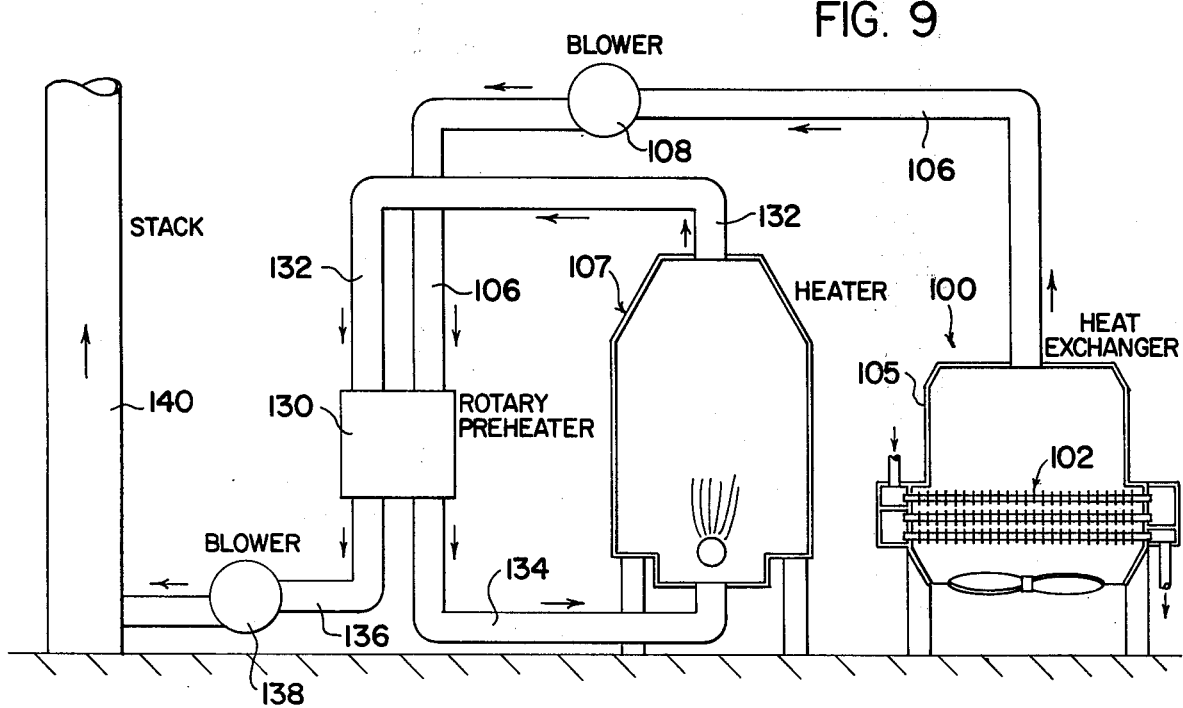
FIG. 9 depicts how the present invention may be incorporated into a system having a regenerative type furnace preheater.

FIG. 9 shows an embodiment of the invention in combination with a regenerative or recuperative type air preheater. Air passes across the air exchanger 100 and is collected in hood 105. The hot air flows through conduit 106, then through preheater 130. The air may, if necessary, be boosted in pressure by blower 108 as shown. Air from conduit 106 passes through preheater 130, picking up additional heat from the flue gas exiting the top of heater 107. After being heated, the air leaves the preheater in conduit 134 and is sent to heater 107 as combustion air. The hot flue gases leave the heater in conduit 132, exchange heat in the preheater, and exit the preheater in conduit 136. Blower 138 provides the moving force for the air through the preheater and the stack 140. By using the present invention in this manner, the efficiency of heat recovery is improved and a reduction in corrosion is obtained in the regenerative type air preheaters.

DESCRIPTION OF PREFERRED EMBODIMENT

The System

In the preferred embodiment of the invention, the exhaust air from one air-cooled heat exchanger is used to supply air to one fired heater. Normally, the amount of air issuing from such an exchanger is sufficient to supply the combustion air requirements of a single fired heater. It is contemplated, however, that more than one heater may be supplied by a single exchanger, and conversely, more than one exchanger may supply a single heater.

A fired heater or furnace is used to raise the temperature of some fluid by burning fuel. The burning fuel must first warm the incoming air for combustion before the process fluid may be heated. Thus any increase in incoming air temperature improves the heater efficiency and reduces fuel consumption. The present invention's system provides a unique method for obtaining preheated air that is normally dissipated to the atmosphere, for use in these heaters.

As stated in U.S. Pat. No. 3,436,733 in the Background, it is uncommon to find air preheaters associated with major petroleum refinery heaters. This is due to both the cost of such systems and their mechanical reliability. However, it is not uncommon to find air-cooled process exchangers in such refining or chemical complexes. This is due to the many advantages these exchangers have when compared to water-cooled exchangers in certain applications.

Thus the present invention provides a low cost method for saving energy through heat recovery by using this recovered heat to reduce fuel consumption of a heater without the drawbacks of reliability or corrosion found in the prior art.

The Heater

The heater applicable to the present invention is any heater that is directly fired by the combustion of a fuel with air. Typically, and preferred, is a process heater used to raise the temperature some process fluid. However, such heaters as boilers that produce steam, combinations of boilers and process fluid heaters, and waste gas burners are also within the scope of fired heaters. Basically, any furnace or heater having at least one burner which fires fuel with combustion air may be used in the present invention. The fuel used in these heaters is usually gas or oil but may also be coal.

The Duct

The duct, used to transfer the hot air from the exchanger to the fired heater, normally consists of a sheet metal enclosure. The materials of construction for ducts to transport air are known in the art, and any such material is suitable. The duct may be insulated to prevent heat loss. The economics of such insulation will depend on the distance between the exchanger and the heater, and also the ambient air temperatures that may exist.

The size of the duct will of course depend on many factors. The larger the combustion air requirements for the heater the larger the duct. Also, the duct size may be increased to provide less pressure drop from the exchanger to the furnace.

Where the exchanger is close to the heater, the fan normally associated with the air-cooled exchanger may be sufficient to provide enough pressure to move the air. Where the distance is greater, a blower may be located between the exchanger and the heater to increase the pressure and hence the airflow.

The blower may also be located in the inlet to the exchanger, either supplementing or replacing the exchanger fan. The replacement of the fan will depend on whether the total volume of exhaust air is collected, or just a part.

The exhaust air enters the duct from the exchanger either from an airflow chamber described later, or from a hood that covers all or part of the air exchanger exhaust.

The flow of air may be controlled by dampers located at the burner, before or after the blower, or in the hood or flow channel.

The Exchanger

Unique to the present invention is the use of an air-cooled process heat exchanger to provide heated air to a fired heater or furnace. Such a process heat exchanger is defined as one whose function is to cool a process or product stream found in a chemical or refining plant operation. The air used to cool such process or product streams has, in the past, been discharged to the atmosphere. The present invention recovers this heat and transfers it to a heater or furnace.

The process stream being cooled in the process heat exchanger should not be confused with utility streams such as water or steam. As discussed in the background of the invention, steam preheat coils have been used in the prior art to heat combustion air. The use of such steam, however, does not provide the energy savings associated with the present invention. The steam, being a utility stream, must first be produced, typically in a boiler.

The process heat exchanger must also be independent from the furnace or heater. The prior art has many methods for recovering heat found in the flue gas of a heater and transferring such heat to the combustion air. Although such methods improve the heater efficiency, they do not recover the heated air that is found elsewhere in the chemical plant operations. Air-cooled process heat exchangers are typically found on reactor effluent streams, distillation column overhead or side-draw streams, product streams being cooled and sent to storage, and the like.

The air-cooled process heat exchanger for use in this invention is known in the art, being one where ambient air is forced by a fan to flow across a bank of externally finned tubes that contain a process fluid to be cooled. A typical air cooler has a horizontal section containing the finned tubes, a fan, a supporting structure, and various accessories such as louvers, fan guards, etc. A more detailed description of such coolers may be found in *Perry's Chemical Engineers Handbook*, 5th Ed. 1973 Section 11–23.

Also known in the art, and mentioned previously, is the use of air-recirculation systems with air exchangers. Normally, such systems are used only where the ambient air temperature drops low enough to cause freezing of the fluid or freezing of moisture on the tubes. The present invention contemplates the use of such recirculation systems not to prevent freezing, but to further increase the exhaust air temperature from the exchanger. By lowering the airlow across the exchanger, this will provide even hotter combustion air, which in return decreases the fuel requirements of the heater.

Conventional air coolers are designed to handle large quantities of air with a small rise in air temperature. It is preferred, however, to reduce this airflow and at the same time increase the exit air temperature. This concept does not change the amount of heat removed by the cooler, and has the benefit of warmer exhaust air to the heater. Although the air recirculation system described above will achieve this goal, there are also more novel methods that may be used with the present invention.

One such method is to use variable pitch fans to reduce the airflow across the air cooler and maximize the air outlet temperature. Regulating airflow has normally been used only to prevent overcooling. By maximizing the outlet air temperature through reducing airflow, there is essentially no effect on cooling capacity of the air cooled exchanger, and yet benefits are realized in the heater from the higher temperature combustion air. One possible means for achieving this is to reduce the airflow until the process stream outlet temperature reaches a fixed minimum value.

Another and preferred method to increase the exhaust air temperature of the exchanger is by using an airflow channel as described in the drawings. The airflow channel may be made of the same material as the duct, and consists of internal top and bottom chambers located above and below the tube bundle respectively. The air flows into the channel, across the tube bundle into the top chamber and back across the bundle into the bottom chamber, creating a serpentine flow of air. The number of chambers will depend upon the length or width of the exchanger and the available pressure drop allowed for the airflow.

The air-cooled process heat exchanger using such an airflow channel comprises:
(a) a tube bundle, said bundle being one or more rows of one or more parallel tubes connected between a first and a second end of the exchanger;
(b) an airflow channel, having one or more top chambers above the tube bundle in open communication with said bundle, and having one or more bottom chambers below the tube bundle in open communication with said bundle, wherein said top chambers are offset with respect to said bottom chambers, and wherein a serpentine airflow across the tube bundle is created by movement of the air between the top and bottom chambers; and (c) means for moving air across the tube bundle.

Because the flow pattern of the process fluid in the tube bundle can vary, the exact placement of the air channel for optimum efficiency will vary also. In a single pass air exchanger the process fluid flows in one end, makes one pass through the bundle, and flows out the other end of the exchanger. Here the airflow channel may be mounted parallel to or perpendicular to the tube bundle. The choice will depend on the size and width of the exchanger.

In two or more pass air exchangers, the process fluid returns to the same side as the inlet, making more passes across the middle section of the exchanger. The fluid may return only in the bottom tubes. In such an arrangement, the fins on the bottom tubes that are in the air chamber [which is mounted perpendicular to the tubes], may be removed so that the cooler tubes do not reduce the exhaust air temperature. The exchanger may also be designed such that these bottom tubes do not enter the airflow channel, as shown in FIG. 6 of the drawings.

Means should be provided, as shown in FIG. 8, to prevent airflow out of the channel.

The width of the airflow channel will depend on the size of the exchanger. On large air exchangers, the channel may cover 20–50% of the top of the exchanger with a coverage of 10–20% being preferred. On smaller exchangers, the channel may cover 50 to 100% of the top of the exchanger.

The use of a separate airstream in serpentine flow back and forth across the tube bundle permits elevating the exit temperature of the independent airstream well above the normal air cooler exit temperature, again reducing the fuel requirements of the heater.

Air can enter the airflow channel from several sources. The air inlet may draw normally ambient temperature air through the channel. It is preferred, however, that the air inlet draw warmed air that has already passed thru the exchanger. This air may be from the same exchanger having the channel, or can be from an adjacent exchanger.

The present invention achieves great advantage when used in combination with a rotary air preheater as shown in FIG. 9. Cold ambient air greatly increases the corrosion of the rotary elements that are also in contact with the flue gas. The use of the present invention allows warmer air to be fed to the rotary preheater, thus reducing corrosion. Further, higher furnace combustion air temperature will be realized with this combination, thus achieving greater fuel savings.

We claim:

1. In a chemical processing operation in which a mixture of fuel and air is combusted in a furnace to provide heat input, and in which a process fluid, independent of said furnace is cooled by passing said process fluid in heat exchange relation with air in an air-cooled process heat exchanger, and air passing out of said process heat exchanger is discharged to waste, the improvement wherein at least part of the air passing out of said heat exchanger is used as at least part of the air fed to said furnace so that the heat value of the air passing out of said heat exchanger is transferred to said furnace.

2. The method of claim 1 wherein the process heat exchanger has means for increasing the temperature of the air that is in heat exchange relation with said process fluid.

3. The method of claim 2 wherein said means for increasing the temperature of the air comprises passing at least a portion of said air in heat exchange relation with said process fluid two or more times.

4. The method of claim 1 wherein said process heat exchanger comprises a tube bundle containing said process fluid, an air inlet and an air outlet, and means for moving air across the tube bundle.

5. The method of claim 4 wherein the air outlet of the process heat exchanger is at least partly connected to a duct, said duct passing at least part of said air from the air outlet to said furnace.

6. The method of claim 4 wherein the heat exchanger additionally has an airflow channel covering a portion of the tube bundle, having one or more top chambers above the tube bundle and one or more bottom chambers below the tube bundle, wherein the top chambers are offset with respect to the bottom chambers, and wherein a serpentine airflow across the tube bundle is created in the air flow channel by movement of the air between the top and bottom chambers, thereby increasing the temperature of the air in heat exchange relation with said process fluid.

7. The method of claim 6 wherein the airflow channel is perpendicular to said tube bundle.

8. The method of claim 6 wherein the airflow channel is parallel to said tube bundle.

9. The method of claim 7 wherein the airflow channel is connected to a duct, said duct passing at least part of said air from the airflow channel to said furnace.

10. The method of claim 6 wherein the airflow channel has an inlet, said inlet being located above the heat exchanger whereby at least part of the air passing out of said heat exchanger flows through said airflow channel.

11. The method of claim 5 wherein said furnace additionally contains an air preheater, said preheater being used to recover heat from the furnace, and wherein said duct passes through said preheater prior to said furnace thereby further increasing the temperature of the air being transferred to said furnace.

12. An apparatus for preheating air to a furnace comprising:
(a) a heat exchanger for effecting indirect heat exchange between a first process fluid and air;
(b) furnace means for combusting a fuel with air, being independent from said heat exchanger and said first process fluid; and
(c) means for transferring at least a part of the air passing out of said heat exchanger to said furnace means.

13. The apparatus of claim 12 wherein said furnace means is a furnace that heats a second process fluid independent from said first process fluid.

14. The apparatus of claim 12 wherein said heat exchanger comprises a tube bundle containing said first process fluid, an air inlet and an air outlet, and means for moving air across the tube bundle.

15. The apparatus of claim 14 wherein said means for transferring air from said heat exchanger to said furnace means comprises a duct.

16. The apparatus of claim 15 wherein said duct has a first end connected to said heat exchanger, said first end additionally containing a hood, said hood covering between 10–100% of the air outlet of the heat exchanger.

17. The apparatus of claim 15 wherein said duct contains a blower for conveying the outlet air of the heat exchanger to said furnace means.

18. The apparatus of claim 14 wherein the heat exchanger contains an air recirculation system, wherein at least part of the air after passing across the tube bundle is recirculated back to the air inlet.

19. The apparatus of claim 14 wherein the heat exchanger additionally has an airflow channel covering a portion of the tube bundle, having one or more top chambers above the tube bundle and one or more bottom chambers below the tube bundle, wherein the top chambers are offset with respect to the bottom chambers, and wherein a serpentine airflow is created in the airflow channel by movement of the air between the top and bottom chambers, thereby increasing the temperature of the air in heat exchange relation with said first process fluid.

20. The apparatus of claim 19 wherein the air flow channel is perpendicular to said tube bundle.

21. The apparatus of claim 19 wherein the air flow channel is connected to a duct, said duct passing at least part of said air from the airflow channel to said furnace means.

22. An air-cooled process heat exchanger comprising:
(a) a tube bundle, said bundle being one or more rows of one or more parallel tubes connected between a first and a second end of the exchanger;
(b) an airflow channel covering a portion of said bundle, having one or more top chambers above the tube bundle in open communication with said bundle, wherein said top chambers are offset with respect to said bottom chambers, and wherein a serpentine airflow across the tube bundle is created by movement of the air between the top and bottom chambers, independent of the air passing over the remaining portion of said bundle; and
(c) means for moving air across the tube bundle.

23. The exchanger of claim 22 wherein the airflow channel has a length perpendicular to the parallel tubes and a width parallel to the tubes.

24. The exchanger of claim 23 wherein the width of the airflow channel is between 5-50% of the distance between the first and second ends of the exchanger.

25. The exchanger of claim 23 wherein the number of rows of tubes is two or more, and wherein one or more rows of tubes are shorter than the remaining rows, said shorter rows connected to a third end located between said first and second ends, wherein said airflow channel is located between said first and third ends, whereby the shorter rows are excluded from the airflow channel.

26. The exchanger of claim 23 wherein the air flow channel has means for preventing airflow parallel to the tube bundle.

27. The exchanger of claim 22 wherein the airflow channel has a length parallel to the tubes and a width perpendicular to the tubes.

28. The exchanger of claim 22 wherein the tubes are finned tubes, and wherein the fins of one or more tubes located within the airflow channel and having a cooler temperature with respect to the other tubes in the airflow channel are removed.

* * * * *